United States Patent [19]

Ohara

[11] 4,375,065
[45] Feb. 22, 1983

[54] LASER RECORDER

[75] Inventor: Yuji Ohara, Asaka, Japan

[73] Assignee: Fuji Photo Film Co., Ltd., Kanagawa, Japan

[21] Appl. No.: 258,692

[22] Filed: Apr. 29, 1981

[30] Foreign Application Priority Data

Apr. 30, 1980 [JP] Japan .................................. 55-57267

[51] Int. Cl.³ ............................................. G01D 15/4
[52] U.S. Cl. ..................................... 346/108; 358/298
[58] Field of Search ............................ 346/76 L, 108; 358/296–300, 302, 283; 369/124

[56] References Cited

U.S. PATENT DOCUMENTS 3,725,574  4/1973  Gast .................................... 358/298
4,001,492  1/1977  Suzuki et al. .................... 358/298 X

FOREIGN PATENT DOCUMENTS 55-0102966  8/1980  Japan .................................. 358/298

OTHER PUBLICATIONS

IBM Technical Disclosure Bulletin, vol. 18, No. 3, "Adaptive Contrast Ranging for Images", Wong, Aug. 1975 pp. 914–917.

Primary Examiner—G. Z. Rubinson
Assistant Examiner—W. J. Brady
Attorney, Agent, or Firm—Sughrue, Mion, Zinn, Macpeak and Seas

[57] ABSTRACT

A semiconductor laser recorder capable of reproducing pictures such as a photograph having half-tones with a high accuracy. An input signal is sampled at a predetermined sampling rate. A first signal is produced in response to a level of the sampled input signal which determines a number of high frequency pulses which are to be outputted during the sampling period. A second signal is also produced in response to the sampled level of the inputs signal which determines the width of at least one pulse which is outputted during the same sampling period. The second signal is produced only when the level of the input signal exceeds a predetermined value. The first and second signals are combined and utilized to binary modulate a semiconductor laser.

7 Claims, 16 Drawing Figures

LASER RECORDER

BACKGROUND OF THE INVENTION

The present invention relates to a recording device using a semiconductor laser which is capable of reproducing a picture such as a photograph having half-tones with a high accuracy.

To intensity modulate a laser beam to record the image of a picture having half-tones, any of (1) a technique of using an ultrasonic optical modulator, (2) a technique of varying the discharge current of a gas laser, and (3) a technique of varying the current of a semiconductor laser may be employed.

The first technique is disadvantageous in that it uses an expensive ultrasonic optical modulator and mechanism for finely adjusting a modulator to the Bragg angle and hence, as a whole, has a high manufacturing cost and intricate construction.

The second technique of varying the discharge current of the gas laser is also disadvantageous in that the modulation frequency is low, several hundred Hertz, and the service life of the laser tube is reduced due to variations of the discharge current.

Figure 1:
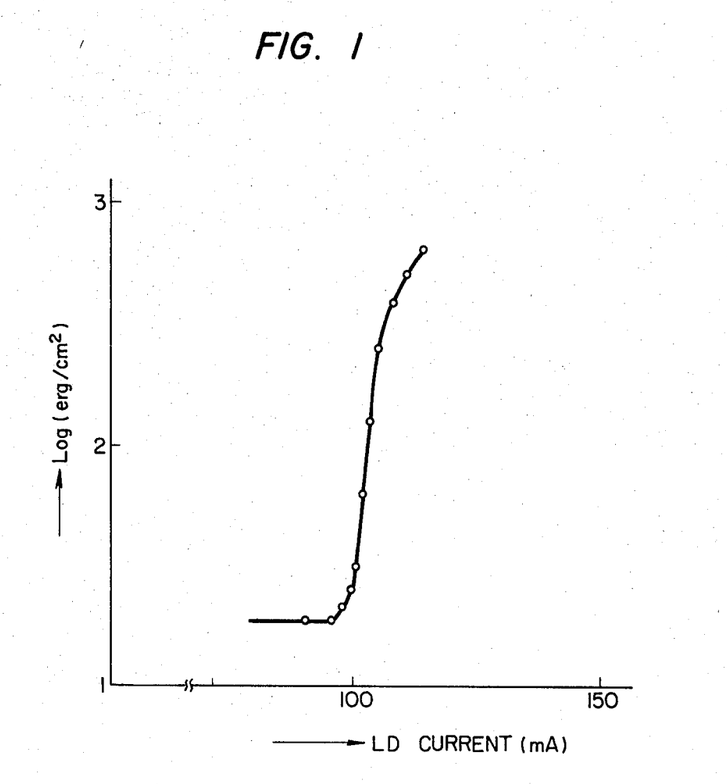
FIG. 1 is a characteristic diagram indicating semiconductor laser current with optical output.

The third technique of varying the current of the semiconductor laser is disadvantageous in that, since the semiconductor laser has an optical output vs. current characteristic as shown in FIG. 1, the optical output is greatly changed merely by slightly changing the input current thereto, and accordingly it is considerably difficult to record an image having half-tones by controlling the optical output in an analog mode by varying the applied current.

Accordingly, an object of the invention is to provide a laser recorder which can reproduce half-tones with high accuracy.

The invention is intended to improve the quality of a picture which is produced by a laser recorder in which, as disclosed in U.S. Patent Application Ser. No. 214,815 filed Dec. 9, 1980, an input signal is sampled with a sampling pulse signal, a high frequency pulse having a frequency is of at least 10 Hz is generated using the sampling pulse signal, and the number of high frequency pulses which are outputted during a sampling period is controlled and applied to a semiconductor laser.

The term "sampling pulse" or "sampling pulse signal" as herein used is intended to mean a pulse or pulse signal for sampling an input video signal at predetermined time intervals. The frequency of the sampling pulse signal may be selected as desired although it is preferable, in order to reproduce the picture with a high resolution, that the frequency be slightly higher than the maximum frequency of the input video signal. Furthermore, the term "high frequency pulse signal" is intended to mean a pulse signal having a frequency higher than that of the sampling pulse signal preferably a several hundred to several thousand Hertz. These two pulse signals may be generated independently of each other. However, it is desirable that the sampling pulse signal be obtained by frequency-dividing the high frequency pulse signal.

The amount of exposure of each of the picture elements which form a picture is defined by the number of high frequency pulses which are applied to a semiconductor laser according to the level of an input video signal during a sampling period. If the optical energy of the semiconductor laser applied to a photosensitive material corresponding to one high frequency pulse is represented by $\Delta e$, and the number of high frequency pulses which are provided for a picture element according to the level of an input video signal is represented by N, the total optical energy, i.e. the exposure E applied to the picture element is:

$$E = N \cdot \Delta e. \quad (1)$$

The number of high frequency pulses not only corresponds linearly to the input signal, but also may take into account the logarithmic conversion of the input signal and characteristics of a recording material employed, or a predetermined stored input and output characteristic. The term "input signal" as herein used is intended to mean a video signal, which may be either an analog signal or a digital signal.

The relation between the number of pulses and the density of a recorded image where the image is recorded with a semiconductor laser which is controlled by the number of high frequency pulses applied thereto will be described with reference to FIG. 2.

Figure 2:
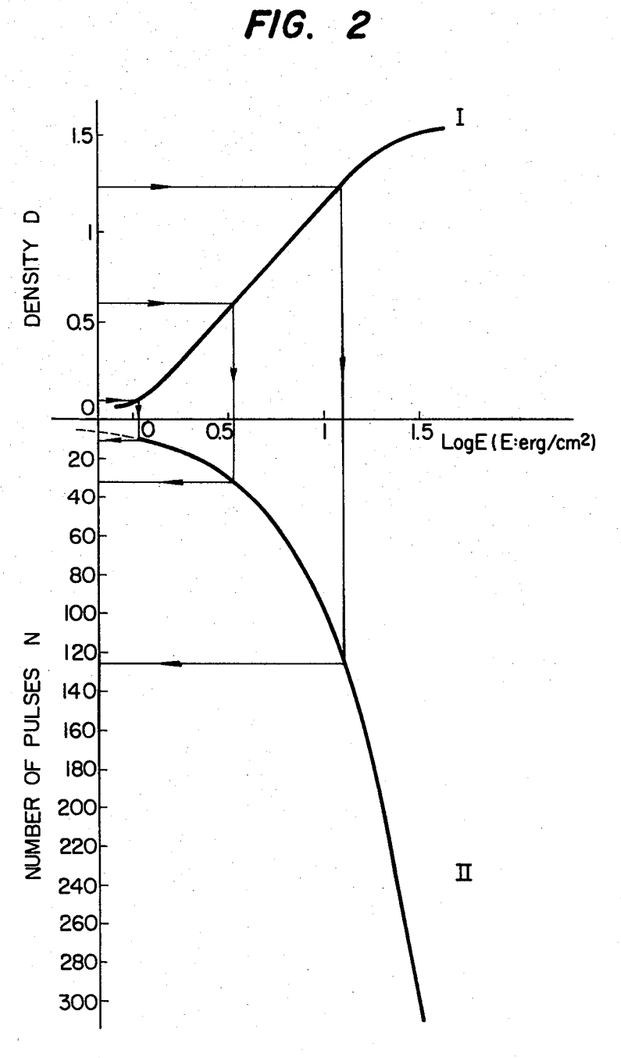
FIGS. 2 and 3i–3iii are diagrams for a description of the principles of pulse-number modulation and pulse-width modulation.

Curve I in FIG. 2 is a characteristic curve of a recording material. More specifically, it is an example of the relation between the logarithmic value of the exposure E and the density D. Curve II in FIG. 2 is an example of the relation between the number N of high frequency pulses outputted and the logarithmic value of the exposure E for the recording material obtained from the number N.

Once a density level is selected in FIG. 2, the corresponding number N of high frequency pulses can be obtained as indicated by the arrows in FIG. 2. If, for instance, the density D is changed from 0.1 to 0.2 in the low density part of FIG. 2, the pulse number N is increased only by about nine pulses. However, if the density D is changed from 1.3 to 1.4 in the high density part of the curve, it is necessary to increase the pulses number N by about 50 pulses.

As is apparent from the above description, in order to reproduce gradations at equal density intervals with a sufficiently high accuracy, the frequency of the high frequency pulse signal must be much higher than that of the sampling pulse signal, for instance higher by several hundred to several thousand times.

The relation of the frequency $f_s$ of the sampling pulse signal, the frequency $f_H$ of the high frequency pulse signal and the maximum pulse number $N_{max}$ required for the maximum level of the input signal for which the maximum exposure should be provided is defined by the following expression:

$$f_H \geq N_{max} \times f_s. \quad (2)$$

If it is required to improve the accuracy in reproducing the gradation by making the density intervals smaller or, depending on the characteristics of the photosensitive material such as the maximum gradient $\gamma$ of the characteristic curve and the range of density D, the maximum pulse number $N_{max}$ will be much larger than the pulse number N in FIG. 2. As a result, the frequency $f_H$ of the high frequency pulse signal becomes very high. Accordingly, it may be difficult to construct a circuit for implementing this technique.

For instance, if the sampling pulse frequency $f_s = 100$ KHz and the maximum pulse number $N_{max} = 500$, the corresponding frequency $f_H$ of the high frequency pulse signal is, from expression (2), 50 MHz. In this case, the implementing circuit cannot be constructed with standard TTL logic elements and ECL logic elements must be used with the result that disadvantageously the circuit is considerably expensive.

Figure 3:
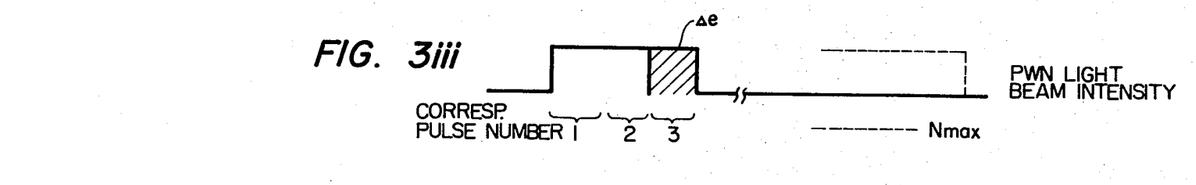
Figures 3, 3I:
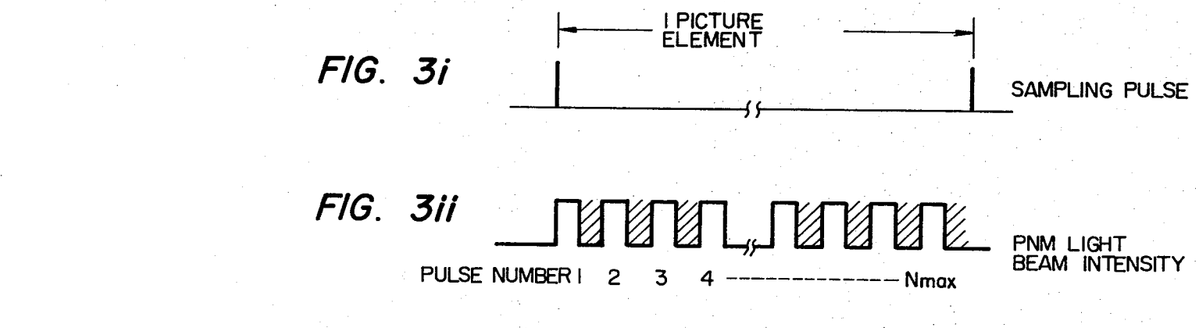

Another drawback is as follows: If as shown in FIG. 3, the maximum number $N_{max}$ of high frequency pulses is outputted during the sampling period of a picture element, no light is provided during a period (shaded part in FIG. 3ii) between adjacent pulses as a result of which the utilization factor of the light source is low accordingly making it necessary to increase the intensity of the output light of the light source.

Furthermore, as described in co-pending U.S. Patent application Ser. No. 214,815, when the light beam is outputted with a pulse width corresponding to the number N of high frequency pulses as indicated in FIG. 3iii (hereinafter referred to as "pulse-width" modulation 11 when applicable), the optical utilization factor is approximately doubled while the exposure increment $\Delta e$ is correspondingly about twice that for pulse-number modulation (FIG. 3ii). As a result, the resolution of an exposure level for each picture element, i.e. the reproduction density resolution, is unavoidably reduced.

In view of the foregoing, an object of the invention is to provide a laser recorder in which the frequency $f_H$ of the high frequency pulse signal can be reduced to half of that in the conventional device with the reproduction density resolution maintained unchanged, whereby the circuit manufacturing cost is decreased and the utilization factor of the light source is approximately doubled.

SUMMARY OF THE INVENTION

The foregoing object and other objects of the invention have been achieved by the provision of a laser recorder in which, according to the invention, an input signal is sampled with a sampling signal. A first signal which is produced by controlling the number of pulses which are outputted during a sampling period according to the level of the input signal and a second signal which is provided by controlling the width of pulses which are outputted during the sampling period according to the level of the input signal are combined into a third signal and a light beam is subjected to binary (ON-OFF) modulation with the third signal to record the image of a picture having half-tones.

BRIEF DESCRIPTION OF THE DRAWINGS

FIG. 5 and FIG. 6i–6viii are diagrams for a description of the operation of the circuit of the laser recorder shown in FIG. 4.

DESCRIPTION OF THE PREFERRED EMBODIMENTS

A preferred embodiment of a laser recording according to the invention will be described with reference to the accompanying drawings.

Figure 4:
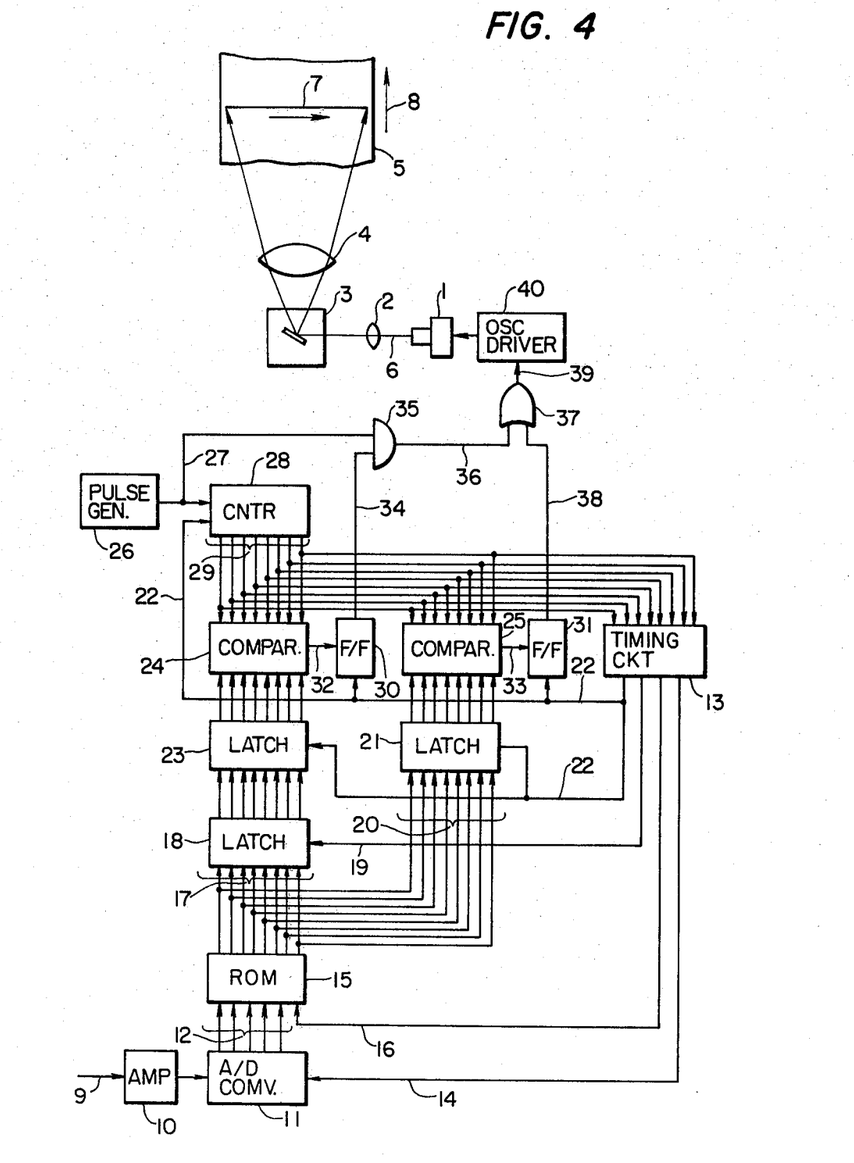
FIG. 4 is a block diagram for a description of a preferred embodiment of a laser recorder according to the invention.

In this embodiment of a laser recorder of the invention as shown in FIG. 4, reference numeral 1 designates a semiconductor laser oscillator, 2 a beam shaping lens, 3 a deflector, 4 a focusing lens, and 5 a recording sheet. It is desirable that the recording sheet 5 be a silver-salt photographic type or an electronic photographic type which can reproduce half-tones and which is sensitive to the wavelength of a semiconductor laser beam (red or infrared wavelength). A semiconductor laser beam 6 current-pulse-modulated is collimated by the beam shaping lens 2, deflected by the deflector 3 and formed into a predetermined spot size by the focusing lens 4. The laser beam thus formed is scanned in a man scanning direction on the recording sheet 5 to draw a scanning line 7 thereon. Auxilliary scanning is carried out by moving the recording sheet 5 in the direction of the arrow 8. In the described embodiment, a galvanometer is employed as the deflector 3.

A semiconductor laser modulating method, which is one of the features of the invention, will be described.

A semiconductor laser can be pulse-modulated with a high frequency of up to several hundred megahertz. The quantity of semiconductor laser light produced by the laser can be controlled by controlling the number of pulses (hereinafter referred to as "a pulse-number" when applicable) used to pulse modulate the laser thereby to record half-tones with a high accuracy.

An example of such a pulse modulation technique will be described with reference to FIG. 3. An input video signal 9 is amplified by a waveform shaping amplifier 10 to a predetermined level. The video signal 9 is, for instance, a facsimile input signal representative of the density of the original picture.

The input signal thus waveform-shaped is applied to A/D (analog-to-digital) converter 11 where it is quantized, for instance, into a 5-bit digital signal 12. The operation of the A/D converter 11 is controlled by a sampling pulse signal 14 outputted by a timing circuit 13. The A/D converter 11 stores the digital signal until a subsequent sampling pulse is applied thereto. The digital signal 12 is inputted to a digital value collation circuit 15. The digital value collation circuit 15 outputs a high frequency pulse number N corresponding to an input signal level, i.e. a density level D as described with reference to FIG. 2. The circuit 15 may be implemented with a PROM (programmable read-only memory). The bits of the input signal 12 are applied as an address signal to the circuit 15 in response to which the circuit 15 outputs the high frequency pulse number N which stored in that address.

In the above-described embodiment, the signal from the facsimile transmitter is a signal representative of the density of the original picture which is in the form of a logarithmic conversion signal. However, if a signal in logarithmic form is inputted, a circuit for carrying out logarithmic conversion can be included in the digital value conversion circuit.

In the above-described embodiment, the bits of the input signal 12 are applied in sequence to the first address input bit through the fifth address input bit of the digital value collation circuit 15 and an address switching signal 16 from the timing circuit 13 is applied to the sixth address input bit of the circuit 15.

Figure 5:
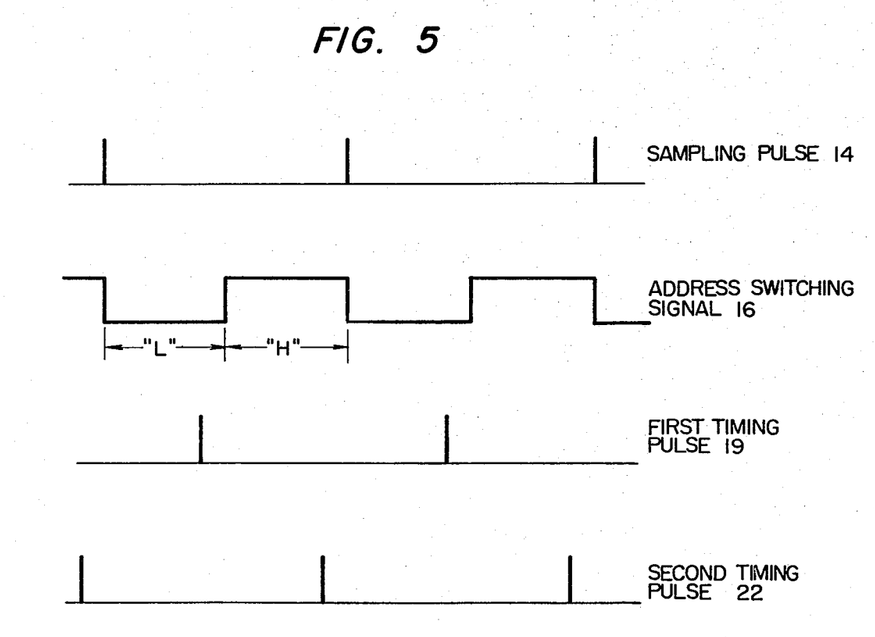

The relation between the sampling pulse signal 14 and the address switching signal 16 is shown in FIG. 5. Specifically, the address switching signal 16 assumes a low logical level "L" and a high logical level "H" alternately during each sampling period. Accordingly, the digital value collation circuit 15 outputs two types of data successively in response to the address input which is specified by the combination of the 5-bit input signal 12 and the address switching signal 16. A first data word 17 which is outputted by the digital value collation circuit when the address switching signal 16 is at "L" is inputted to a first latch circuit 18 and is latched therein in response to a first timing pulse 19 from the timing circuit 13. On the other hand, a second data word 20 which is outputted by the digital value collation circuit 15 when the address switching signal 16 is at "H" is applied to a second latch circuit 21 and is latched therein in response to a second timing pulse 22 from the timing circuit 13. At the same time, the first data word 17 latched by the first latch circuit 18 is applied to a third latch circuit 23 and is latched upon receipt of the second timing pulse 22. The first data word 17 latched by the third latch circuit 23 is applied to a first input port of a first comparison circuit 24 while the second data word 20 latched by the second latch circuit 21 is applied to a first input port of a second comparison circuit 25.

Pulses of the first timing pulse signal 19, as shown in FIG. 5, are outputted when the address switching signal 16 is at "L" and the first data word 17 outputted by the digital value collation circuit 15 is stable. Similarly, pulses of the second timing pulse 22 are outputted when the address switching signal 16 is raised to "H" and the second data word 20 outputted by the digital value collation circuit 15 is stable.

A counter circuit 28 operates to count pulses of a high frequency pulse signal 27 which is outputted by a high frequency pulse generator 26. The count value 29 of the counter circuit 28 is applied to a second input port of the first comparison circuit 24 and to a second input port of the second comparison circuit 25. The count value 29 is further applied to the timing circuit 13. The timing circuit 13 produce the above-described sampling pulse signal 14, address switching signal 16, first timing pulse signal 19 and second timing pulse signal 22 accordingly to the content of the count value 29. The second timing pulse signals 22 is further applied to the clear terminal of the counter 28 to clear the counter 28 and to the set terminals of first and second flip-flop circuits 30 and 31.

Figure 7:
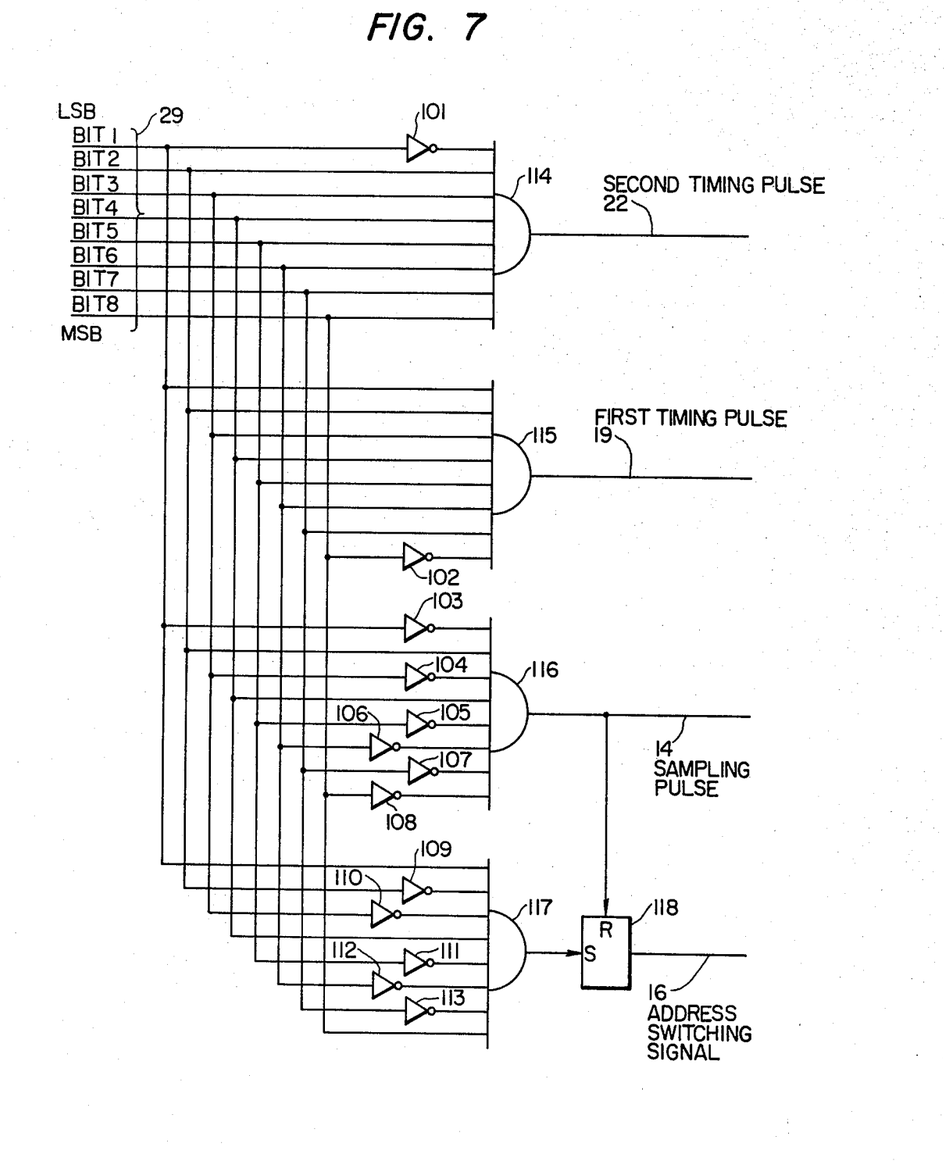
FIG. 7 is a schematic diagram of a timing circuit used in the laser recorder of FIG. 4.

The terminal circuit 13 will be described in more detail with reference to FIG. 7 which is a circuit diagram showing an example of the timing circuit 13 which includes inverters 101–113, AND gates 114–117 and a flip-flop 118. The following discussion assumes that 254 pulses are outputted from the pulse generator 26 during each sampling period.

In this example of the timing circuit 13, the second timing pulse signal 22 is generated when the count value 29 of the counter circuit 28 is equal to 254 by the inverter 101 and the AND gate 114. The first timing pulse signal 19 is generated when the count value 29 is equal to 127 by the inverter 102 and the AND gate 115. The sampling pulse signal 14 is generated when the count value 29 is equal to 10 by the inverters 103–108 and the AND gate 116. Further, a signal generated when the count value 29 is equal to 137 by the inverters 109–113 and the AND gate 117 is applied to the set terminal of the flip-flop 118 while the sampling pulse is applied to the reset terminal thereof. Thus, the address switching signal 16 outputted from the flip-flop 118 is at a logic level "L" when count value 29 is increasing from 10 to 137 and is "H" when the count value 29 is decreasing from 137 back to 10. In this example, although the time from the generation of the sampling pulse signal 14 until the generation of the first timing pulse 19 is set to be the time period for 117 counting time increments ($=127-10$), the first timing pulse signal 19 may be outputted insofar as the following condition is satisfied. That is, it may be outputted when the input video signal 9 quantized by the A/D converter 11 with the timing of the sampling pulse signal 14 is converted to the input digital signal 12 and the first data word 17 from the digital value collation circuit 15 is stably outputted when the address switching signal 16 is "L". It should accordingly be noted that setting of the variation of the count value 29 from the generation of the sampling pulse signal 14 to that of the first timing pulse 19 is given merely as an example. It should further be noted that the time relation given between the sampling pulse 14 and the second timing pulse 22 is only one example thereof.

When the first data word 17 applied to the first input port of the first comparison circuit 24 coincides with the value of 29 of the counter circuit 28, the first comparison circuit 24 outputs a first coincidence signal 32 which resets the first flip-flop 30. On the other hand, when the second data word 20 applied to the first input port of the second comparison circuit 25 coincides with the count value 29 of the counter circuit 28, the second comparison circuit 25 outputs a second coincidence signal 33 which resets the second flip-flop 31. A gate signal 34 outputted by the first flip-flop 30 is applied to one input terminal of an AND gate 35, to the other input terminal of which the output high frequency pulse signal 27 from the high frequency pulse generator 26 is applied. When the gate signal 34 is at "H", the AND gate 35 outputs a pulse-number modulation signal 36 which is applied to one input terminal of an OR gate 37. A pulse-width modulation signal 38 outputted by the second flip-flop 31 is applied to the other input terminal of the OR gate 37. As a result, the OR gate 37 outputs a composite pulse-number pulse-width modulation signal 39 which is applied to a semiconductor laser oscillator driving circuit 40 with which the output of the semiconductor laser oscillator 1 is subjected to on-off control.

Figure 6:
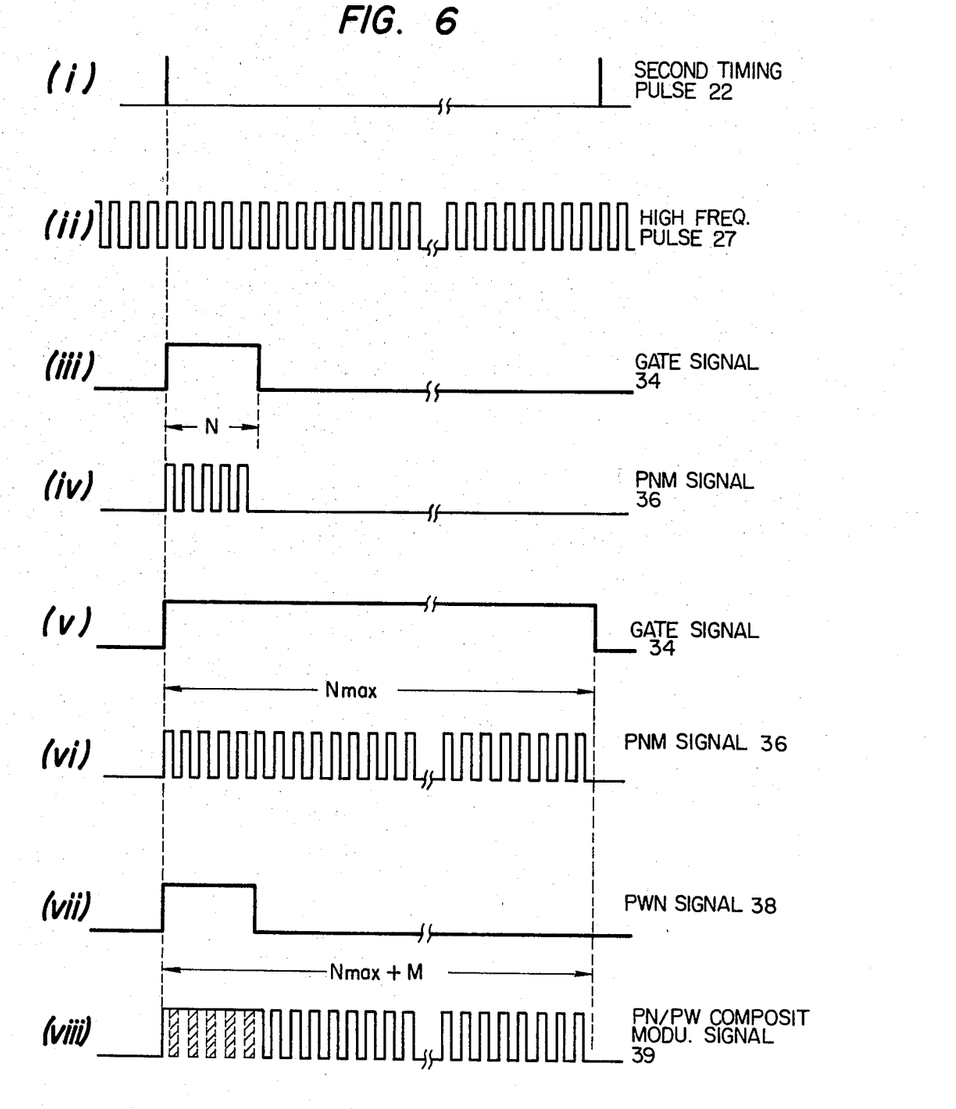

Composite pulse-number pulse-width modulation, which is one of the specific features of the invention, will be described with reference to FIG. 6 in more detail. FIG. 6*i* shows the second timing pulse signal 22. The second timing pulse signal 22 is used to latch the first data word 17 and the second data word 20 respectively in the third latch circuit 23 and the second latch circuit 21, to set the first and second flip-flops 30 and 31, and to clear the counter circuit 28. The gate signal 34 (FIGS. 6*iii* and 6*v*) is used to control the number N of pulses of the high frequency pulse signal 27 (FIG. 6*ii*) provided during the sampling period, i.e. during one cycle of the second timing pulse signal 22. The gate signal 34 is outputted as the pulse-number modulation signal 36 (FIG. 6*iv* or FIG. 6*vi*) by the AND gate 35.

In the above-described embodiment, the term "sampling period" is intended to mean the period of the second timing pulse signal 22 shown in FIG. 2*i* rather than the period of the sampling pulse signal 14 shown in FIG. 5 although the invention is not limited thereto or thereby.

The pulse-width modulation signal 38 (FIG. 6*viii*) outputted by the second flip-flop 31 and the pulse-number modulation signal 36 (FIG. 6*vi*) are applied to the OR gate 37, the pulse-width modulation signal 38 is used to complement the pulse-number modulation signal 36 (FIG. 6vi) as indicated by the shaded parts of FIG. 6viii. Thus, the composite pulse-number/pulse-width signal as shown in FIG. 6viii is obtained.

The above-described laser recorder is so designed that if the exposure level is such that the pulse-number N of the pulse-number modulation signal 36 exceeds the maximum number $N_{max}$ of pulses which can be outputted during the sampling period, the pulse-width modulation signal 38 is outputted in response to the first and second data words 17 and 20 which are provided by the digital value collation circuit 15 according to the level of the input signal 9. Accordingly, in FIG. 2, the amount of exposure is controlled by pulse-number modulation for reproducing low density parts and by composite pulse-number/pulse-width modulation for reproducing high density parts for which the pulse-number N exceeds the maximum pulse-number $N_{max}$.

As is apparent from the above description, according to the invention, the exposure ratio (an exposure per pulse relative to the maximum exposure) is substantially twice that of the conventional modulation technique using the pulse number only. Therefore, in accordance with the invention, in order to obtain the same modulation ratio, the frequency $f_H$ of the high frequency pulse signal defined by expression (2) can be reduced to half that previously required. Accordingly, the circuit can be fabricated with standard TTL logic elements and the utilization factor of the intensity of the light source cna be doubled without decreasing the resolution of an exposure level for each picture element, i.e. the reproduction density resolution. Thus, the output quantity of light of the light source can be reduced. These are significant effects provided by the invention.

What is claimed is:

1. A laser recorder comprising: means for sampling an input signal at a predetermined sampling time period, means for producing a first signal in response to the sampled input signal for controlling a number of pulses to be outputted during said sampling period in accordance with a level of said sampled input signal; means for producing a second signal for controlling the width of pulses to be outputted during said sampling period according to said level of said sampled input signal; means for combining said first and second signals to produce a third signal; and means for modulating a light beam source in accordance with said third signal.

2. The laser recorder of claim 1 wherein said means for modulating said light beam source binary modulates said light beam source in response to said third signal.

3. The laser recorder of claim 1 wherein said light beam source comprises a semiconductor laser.

4. A laser recorder comprising: means for sampling an input analog signal at a predetermined sampling time period; means for producing a pulse-number modulation signal in accordance with a level of the sampled input signal for controlling a number of first pulses to be outputted during said sampling period; means for producing a pulse-width modulation signal for controlling the width of at least one second pulse to be outputted during said sampling period, said width being determined in accordance with said level of said input signal and said pulse-width modulation signal being produced only when said level of said input signal exceeds a predetermined value; means for combining said pulse-number modulation and pulse-width modulation signals to produce a third signal; a semiconductor laser source; and means for binary modulating said semiconductor laser source in accordance with said third signal.

5. The laser recorder of claim 4 wherein said pulse-number modulation and pulse-width modulation signals comprise digital words.

6. A laser recorder comprising: an analog-to-digital converter, an analog input video signal being coupled to an analog input of said analog-to-digital converter; a timing circuit for producing a sampling pulse signal, an address switching signal, a first timing pulse signal and a second timing pulse signal, said sampling pulse signal having a period equal to a sampling period, said sampling pulse signal being coupled to a sampling signal input of said analog-to-digital converter, said address switching signal being a square wave signal having a period determined by said predetermined sampling period, a pulse of said first timing pulse signal being generated during a first logic state of said address switching signal and a pulse of said second timing pulse signal being generated during a second logic state of said address switching signal; a read-only memory having first address inputs coupled to digital outputs of said analog-to-digital converter and a second address input coupled to said address switching signal; first and second latches having inputs coupled to outputs of said read-only memory, said first timing pulse signal being coupled to a clock input of said first latch and said second timing pulse signal being coupled to a clock input of said second latch; a third latch having inputs coupled to outputs of said first latch and having a clock input coupled to said second timing pulse signal; a pulse generator for producing a continuous stream of high frequency pulses; a counter having a clock input coupled to an output of said pulse generator, said counter producing a count in response to pulses produced by said pulse generator, inputs of said timing circuit being coupled to outputs of said counter and said timing circuit producing said sampling pulse signal, said address switching signal, said first timing pulse signal and said second timing signal in response to said outputs of said counter; first and second comparators having first input ports coupled to said outputs of said counter, said first comparator having a second input port coupled to outputs of said third latch and said second comparator having a second input port coupled to outputs of said second latch, said third latch storing a first digital word representing a number of high frequency pulses and said second latch storing a second digital word representing a pulse width; a first S-R flip-flop having a set input coupled to a comparison output of said first comparator; a second S-R flip-flop having a set input coupled to a comparison output of said second comparator, said counter and said first and second S-R flip-flops having reset inputs coupled to said second timing pulse signal; an AND gate having a first input coupled to said output of said pulse generator and a second input coupled to an output of said first S-R flip-flop; an OR gate having a first input coupled to an output of said AND gate and a second input coupled to an output of said second S-R flip-flop; a semiconductor laser; and a driver for modulating said semiconductor laser in response to an output of said OR gate.

7. The laser recorder of claim 6 wherein said timing circuit comprises first through fourth decoders, said first through fourth decoders having an input coupled to said outputs of said counter, said first through fourth decoders producing output pulses in response to predetermined first through fourth output count values of said counter, said first count value being greater than said second count value, said second count value being greater than said third count value and said third count value being greater than said fourth count value, said second timing signal being produced at an output of said first decoder, said second timing pulse signal being produced at an output of said third decoder, and said sampling pulse signal being produced at an output of said fourth decoder; and a third S-R flip-flop, said output of said fourth decoder being coupled to a reset input of said third S-R flip-flop and an output of said second decoder being coupled to a set input of said third S-R flip-flop, said address switching signal being produced at an output of said second S-R flip-flop.

* * * * *